W. L. MORRIS.
PRECIPITATION TANK.
APPLICATION FILED FEB. 16, 1912.
1,129,893.
Patented Mar. 2, 1915.
2 SHEETS—SHEET 2.
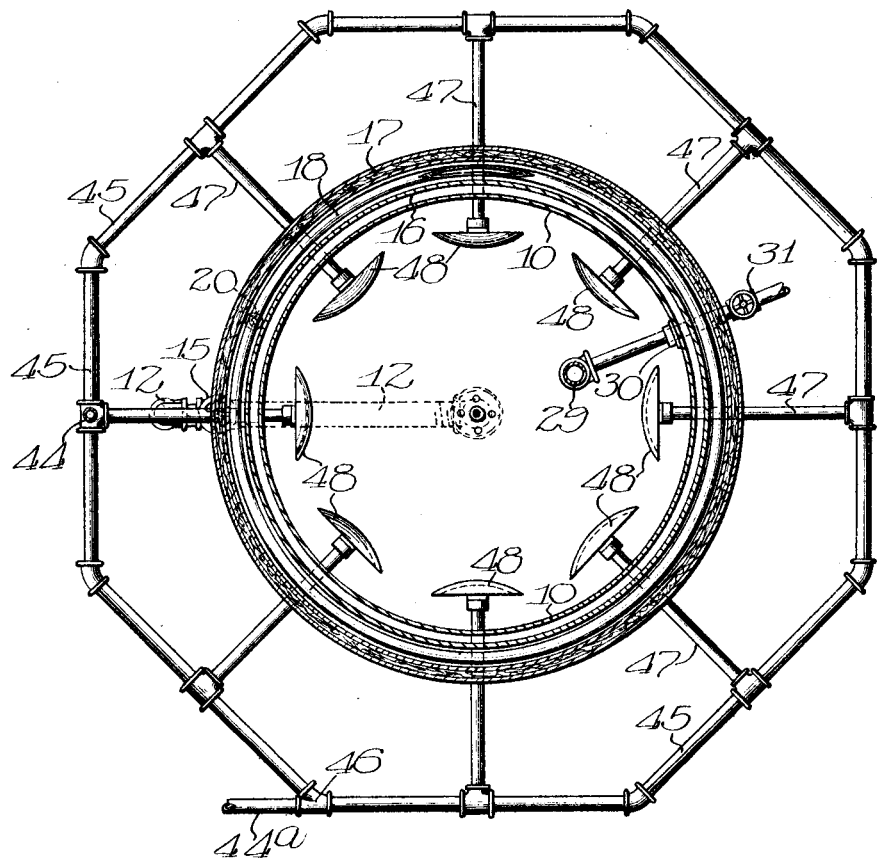
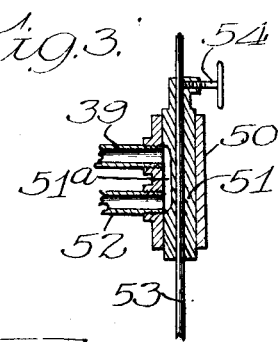
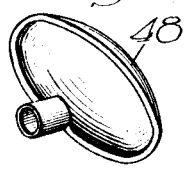

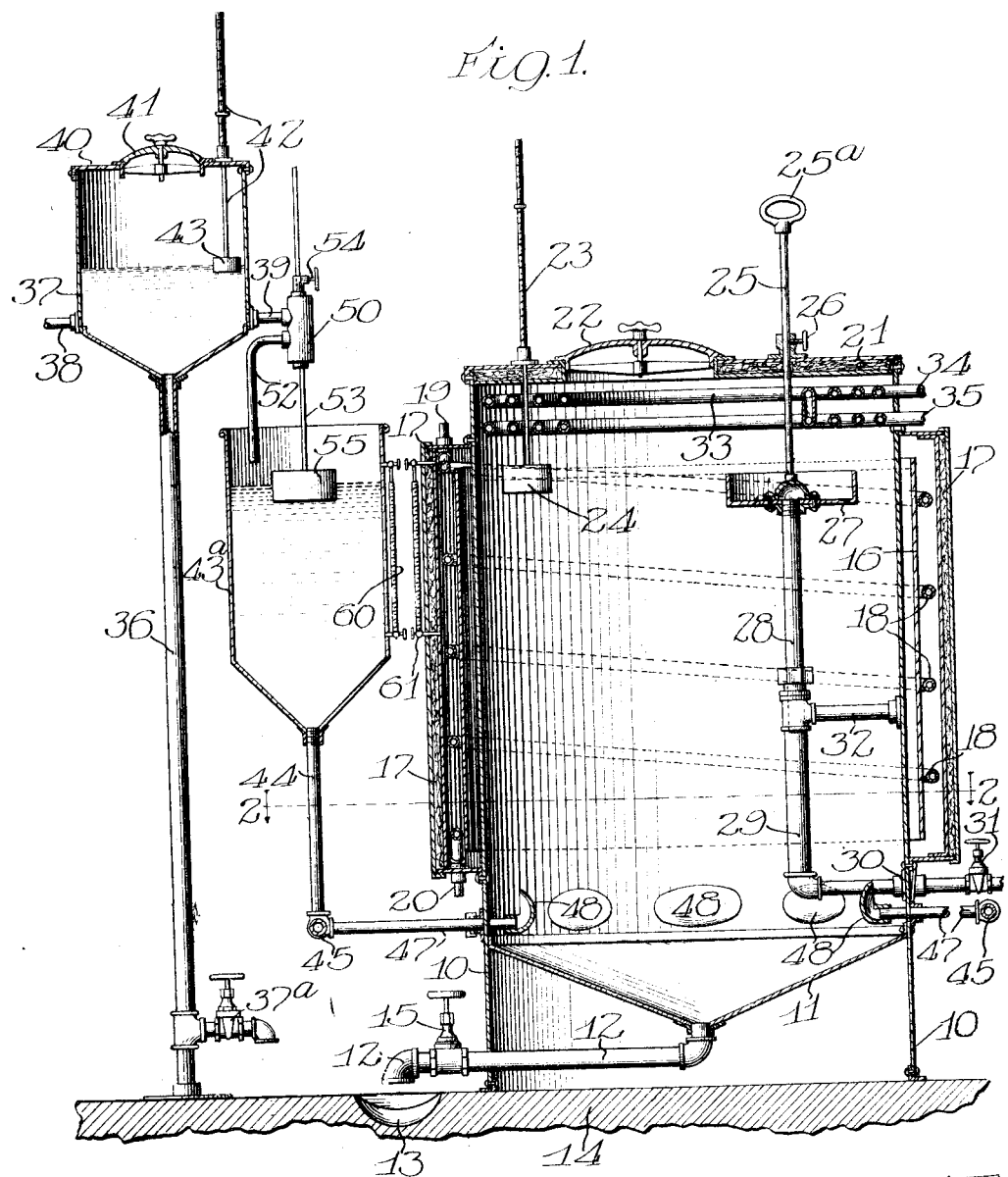

UNITED STATES PATENT OFFICE.

WILLIAM L. MORRIS, OF FORT WAYNE, INDIANA, ASSIGNOR TO S. F. BOWSER & COMPANY, INC., OF FORT WAYNE, INDIANA, A CORPORATION OF INDIANA.

PRECIPITATION-TANK 1,129,893.       Specification of Letters Patent.       Patented Mar. 2, 1915.

Application filed February 16, 1912. Serial No. 677,996.

*To all whom it may concern:*

Be it known that I, WILLIAM L. MORRIS, a citizen of the United States, residing at Fort Wayne, in the county of Allen and State of Indiana, have invented certain new and useful Improvements in Precipitation-Tanks, of which the following is a specification.

The invention relates to precipitation tanks, and the object of the invention is to provide an improved tank and devices connected therewith adapted to receive mixed liquids, as for example, very dirty oil, that is, oil which carries too much impurity to filter it and to settle or precipitate the impurities from the oil and draw off the clear oil.

A further object of the invention is to provide precipitation means of the class described which is adapted to work continuously, and at the same time being so arranged that the incoming oil mixed with impurities to be clarified may be so admitted that there will be the least possible agitation of the materials within the apparatus, agitating the liquid contents of the apparatus as little as possible, and hence shortening the time required in settling and separating the various constituents of the liquids being treated.

It will be apparent that precipitation by the gravity process cannot well take place if there be counter movements induced by the admitting of oil adapted to induce a direct current through a device or counter movements induced by the heat applied or by drawing off the oil. If the rate of velocity of the precipitation in a given quantity of liquid be, for example, one-fourth inch an hour and a counter current of equal velocity be induced, it will be evident that the impurities will not be allowed to descend. There are of course impurities such as metallic dust and the like, which precipitate more rapidly, but in the case of impurities that do move at a very slow rate it is desirable to guard against counter currents in admitting and drawing off oil and in applying heat in order to avoid retarding precipitation.

Heretofore precipitation systems have been used consisting of a series of tanks in which the oil is admitted near the bottom, allowed to rise and pass to a succeeding tank emptying near the bottom thereof, and repeating the operation on through a series of tanks, the attempt being made to secure a certain amount of precipitation in each tank which will not pass from the tank with the overflowing oil. Under such conditions the rate of travel of the oil is relatively fast and the distance through which the oil travels is correspondingly great and the results not satisfactory.

In the present invention I have sought to procure the slightest possible movement of the oil in order to procure the maximum results with respect to precipitation and at the same time shortening the distance of travel as much as possible.

Instead of providing a plurality of settling tanks, I prefer to provide only a single settling tank, which is shown in vertical section in Figure 1, other portions of the apparatus associated with the tank being also shown in section in this view, including what may be termed the batch tank and a feed tank, having direct communication through a feed pipe with the precipitation tank. Fig. 2 is a horizontal sectional view taken near the bottom of the precipitation tank approximately on line 2—2 of Fig. 1. Fig. 3 is a detail sectional view of the float controlled valve in the discharge pipe leading from the batch tank to the feed tank. Fig. 4 is an enlarged detail view of one of the spreaders at the discharge end of the feed pipes on the interior of the precipitation tank.

The capacity of the precipitation tank shown in Figs. 1 and 2 would preferably be of larger size than the ordinary settling tank where a plurality of such tanks are connected together in a single system, and if for example, a battery of three such tanks had been employed in the system to construct a system after the present invention the total capacity of the preferred tank used would equal the combined capacity of the tanks in the old system, and whatever the velocity would be of the liquid through three tanks in series, one tank having a total capacity of, for example, three tanks in series according to the old manner of construction, would have only one-third as much velocity imparted to the liquid flowing through a tank constructed according to the present invention. Furthermore, it is desired to admit oil so it will not cross the path that the precipitated portions would take in falling on the interior of the tank and at the same time admit the oil to be precipitated from the source of supply so that deposits of precipitated material on the interior of the tank will not be disturbed, and also so that such deposits may be removed from the precipitation tank without the agitation of the oil above the same in the tank. It is also found desirable to apply heat to a system precipitation so that it will not be necessary for any oil in the tank to become hotter than any stratum of oil which may lie above another stratum, in other words, at all times having the hottest oil on the top to prevent any tendency toward mixing of oil due to differences in temperature throughout the mass.

In carrying out the principles of the invention a closed tank is provided, preferably of sheet metal as illustrated, and being cylindrical in form, the walls of same being indicated by the reference character 10. The cylindrical portion of the tank may extend to a floor as illustrated in Fig. 1, there being a funnel-shaped bottom 11 secured to the cylindrical walls of the tank 10 a short distance above the floor preferably, in order that the discharge pipe secured to the lowermost extremity of the funnel-shaped bottom, as indicated at 12, may be led through the walls of the cylindrical body portion of the precipitation tank 10 to a convenient place of discharge, as for example. to a gutter indicated at 13 in the floor 14, the outer end of the discharge pipe 12 being provided with a controlling valve as indicated at 15. The funnel-shaped bottom member 11 may be riveted or otherwise secured to the cylindrical walls of the tank 10. In order to heat the settling tank a baffle plate, as indicated at 16, which is cylindrical in form is placed around the outer walls of the tank 10 at some distance in order to form an air space between this cylindrical plate and the walls of the tank. On the outside of the baffle plate 16 and spaced some distance apart therefrom in order to provide an air chamber for a steam coil, an outer protecting wall indicated by the reference character 17, is provided, the same being cylindrical in form surrounding the entire tank throughout the greater portion of its height, being terminated at the top and bottom a little short of the tank bottom and preferably terminating a little short of the upper extremity of the tank as illustrated. The outer protecting wall 17 is preferably constructed in the form of a jacket, being provided with two separated metallic cylindrical shells with an asbestos lining interposed between, as illustrated in Figs. 1 and 2. At the top and bottom of the outer wall or jacket 17 as a means for supporting the same, peripheral flanged portions are extended inwardly as shown and are riveted or otherwise secured to the tank wall. A heating coil for the admission of steam is shown, being indicated by the reference character 18, being provided with a nipple at 19 for the attachment of hose or pipe connection for furnishing steam and a discharge nipple also for suitable discharge connection at 20, the connections 19 and 20 both being preferably through the flanges securing the outer wall or jacket 17 to the wall of the tank 10. At the upper extremity the tank 10 is closed by a top cap, preferably asbestos lined as indicated at 21, and provided with a man-hole and cover indicated at 22. The top cover 21 is provided with a float gage 23, which passes therethrough and protrudes above the top side of the cover, the lower extremity of the gage stick having secured thereto a float 24, which will normally follow the level of the oil within the tank as an indicator. A rod 25 also extends vertically through the top cover 21 and is controlled by a wheel screw indicated at 26, the lower extremity of this rod being connected to a discharge pan which has connected to it in communication with the bottom thereof a discharge pipe, the discharge pan being indicated at 27 and the pipe at 28. The pipe 28 is mounted to telescope in the vertical discharge pipe 29, which has an outlet through the wall of the tank at 30 and is valve controlled as indicated at 31 on the exterior of the tank wall. The discharge pipe 29 is fixed in relation to the wall of the tank not only because the discharge branch thereof passes outwardly through the wall of the tank, but also on account of the bracket 32 secured near the upper end of the pipe end having one end fastened to the interior of the tank wall. The discharge pan 27 and discharge pipe 28 is movably mounted in relation to the portion 29 of the discharge pipe telescoping preferably on the inside thereof as illustrated, any suitable form of packing gland being provided in order to make a liquid-tight connection. By this construction the operator may grasp the upper or hand portion 25$^a$ of the rod 25 and so regulate the vertical height of the discharge 28 and the pan 27. Just below the top cover 21 of the tank and preferably on the inside of the tank are the upper heating coils, of which there may be as many as desired, the same being indicated by the reference character 33, the extremities 34 and 35 on the exterior of the tank indicating the inlet and discharge portions of the coil through which the steam or other heating fluid may be admitted. At the top of a suitable support as the pipe 36 is a batch tank 37, the pipe 36 being utilized not only to support the tank, but being tubular in form and adapted to be used for discharging collections of impurities from within tank 37, the pipe 36 being controlled by a suitable branch and gate valve as indicated at 37ª near the bottom, this branch discharging into or into the vicinity of a sewer 13. The batch tank although smaller than the precipitation tank 10, is of the same general form, and as far as the main casing is concerned being preferably constructed of metal and provided with a depressed or funnel-shaped bottom, with the inlet pipe as well as the discharge pipe leading therefrom, as indicated at 38, 39 respectively, some distance above the bottom of the tank in order to not disturb sediment in the bottom when oil enters or is discharged. The batch tank 37 is provided with a suitable cover 40, having a removable manhole 41, and the indicating portion of a float-controlled stick is shown passing through the cover, the stick being indicated at 42 and the float secured to the same at the level of the liquid within the tank by 43. The oil to be precipitated may be admitted in any desired quantities and at any degree of velocity to the batch tank, from which it may be allowed to pass through the discharge pipe 39 and related means to the supply cup or tank 43ª.

It is desirable that automatic means be provided for regulating the flow of oil from the batch tank and to preserve the desired height of fluid in the supply tank 43ª as well as in the precipitation tank, since the supply tank 43ª which is also provided with a funnel-shaped or depressed bottom, has leading therefrom at the lowermost extremity of the bottom a feed pipe 44 communicating with a feed ring which is in circular or polygonal form, surrounding the precipitation tank near its base, the same being indicated by the reference character 45. The pipe 44 leading from supply tank 43 may be connected with the feed ring pipe 45 by any suitable connections, one convenient form being shown in Figs. 1 and 2, consisting of an L joint at the bottom of pipe 44 and an extension 44ª leading into a branch connection as shown at 46 in Fig. 2 in the feed ring. The feed ring 45 has leading from it a plurality of feed pipes 47, each piercing the wall 10 of the precipitation tank and having at their inner extremities devices as indicated at 48, the function of which is to cause the flow of the oil to be somewhat checked and particularly deflected upwardly and back toward the tank wall 10 in order to avoid any disturbance near the bottom of the tank which might disturb the heavier precipitated elements or those in the process of settling.

To refer now to the construction of the float controlled feeding device for supplying fluid from the batch tank to the supply tank 43ª, reference may be had to Fig. 1 and particularly to the detailed sectional view in Fig. 3, from which it will be seen that the fluid is discharged from a point above the funnel-shaped bottom of the batch tank through pipe 39 into a valve casing 50 secured to the outer extremity thereof. The interior of the casing 50 is provided with a vertical chamber in which a piston 51 is adapted to register and normally to fill the chamber within the casing. The piston member 51 has a cut-away portion or trough at 51ª adapted to extend through and register with the opening from discharge pipe 39 into the casing to the entrance or orifice of a discharge spout 52, which is tapped into the casing and discharges downwardly into the supply tank 43. The piston member 51 is perforated longitudinally and a rod 53 is adjustably secured in the longitudinal perforation by means of the hand wheel and screw indicated at 54, which is tapped into the material at the upper end of the piston member and is adapted to bind the member and the rod securely together. At the lower extremity of rod 53 a float 55 is secured. It will be noted that beyond the extremities of the grooved or trough portion 51ª of the piston the same is formed cylindrically for some distance so that when the liquid within the supply tank 43 rises above a predetermined level with the piston member 51 secured to the rod 53, the piston will rise and cut off the intake port to the discharge pipe 52. It will be noted that on account of the adjustability of the rod 53 within the piston 51 the desired limit to which the liquid shall rise within supply tank 43 may be regulated.

The operation of the device will be better seen when it is understood that the precipitation of impurities within oil is a very slow process, a tank for example four feet in height, requiring under ordinary circumstances from a week to ten days to settle the lighter impurities, or a settling movement of such impurities of only about six inches per day. Such precipitation cannot well take place if there be counter movements induced by the admitting of oil or by heat or by the drawing off of the oil, as already observed. The apparatus shown and described meets the conditions which have been set forth, because the application of heat to the liquid within the precipitation tank 10 coming from above because of the position of the steam coils 33, is in effect much the same as the sun's heat as applied upon the water, because the upper surface of the liquid within the tank will be very hot and the liquid will continue colder the deeper the tank.

It will be noted that the coils 18 surrounding the body of the tank 10 are not shown sufficiently numerous to apply a great quantity of direct heat to the walls of the tank, and that such heat from these coils is more or less diffused by reason of the baffle plate 16 interposed between these coils and the tank wall. The admission of incoming oil at a plurality of points as through the eight discharge pipes 47 and spreaders 48 thereon, breaks up the volume so that comparatively little current is induced while the spreaders deflect the oil and cause it to pass upwardly into a zone somewhat above the discharge orifices and deflectors where settling may take place without disturbing the contents which may lie close to the depressed bottom. At desired intervals the collections of heavier particles will be discharged through the pipe 12 by the control valve 15, or the discharge of the clarified oil from the top of the precipitation tank may take place more or less continuously by the overflowing to the pan 27, thence out through discharge pipes 28 and 29, the latter of which is under the control of valve 31.

It will be evident that the height of the oil in the precipitation tank may be regulated by the movement of the pan 27 controlled by rod 25 and hand member 25ª secured to the top thereof. The gage stick 23 protruding above the top of the tank serves as an indication to the operator of the level of the oil within the precipitation tank. To the same end suitable gages may be employed of a form similar to that used on engine boilers, as indicated at 61 and 60, the former indicating the gage which has a glass reading tube on the precipitation tank and the latter a similar gage on the supply tank. It will be apparent that the normal height of the oil in the supply tank 43ª and in the precipitation tank 10 will be the same, and that when the height in the supply tank reaches a given limit the float controlled valve described will cut off the incoming supply from the batch tank until such time as the level of the oil will have receded sufficiently to allow the float 55 to drop and again open the valve controlling mechanism.

In order that the invention might be understood, I have shown in detail the preferred embodiment of the invention, but it will be apparent that persons skilled in the art may change materially these details without departing from the purpose and scope of the invention.

I claim:

1. In precipitation apparatus for removing impurities from oil and the like, the combination with a precipitation tank provided with an outlet for the heavier precipitated materials near the bottom thereof, of means for admitting incoming materials to the tank comprising an inlet pipe with a discharge orifice on the interior of the tank above the bottom thereof, and an adjustable outlet for discharging the clarified liquid from near the top of the tank comprising a discharge pipe passing through the walls of the tank adjacent the bottom thereof and having an upwardly-extending branch in which the discharge spout of a discharge pan is slidingly mounted, and means for operating the said slidingly mounted discharge pan from the exterior of the tank.

2. In precipitation apparatus for removing impurities from oil and the like, the combination with an inlet for oil to be purified, of an outlet for the clarified liquid comprising a discharge pipe piercing the walls of the tank and having an upwardly-extending branch with which the discharge spout of a discharge pan or funnel is slidingly connected, and means for operating the said discharge pan from the exterior of the tank.

3. Oil precipitation apparatus comprising a tank, an inlet therefor comprising a plurality of inlet pipes disposed above the bottom of the tank around the edges thereof, a deflector secured to the inner end of each pipe to direct liquid upwardly and toward the outer walls of the tank, means for heating the outer walls, and an outlet for discharging liquid from the top surface thereof.

4. In oil precipitation apparatus, the combination with a precipitation tank, of an outlet therefor, and an inlet therefor comprising a plurality of pipes extending through the walls of the tank at intervals and connected together, and deflectors connected to the inner end of each pipe adapted to check the incoming fluid and to return it backwardly and upwardly against the wall through which it has entered.

5. Oil precipitation apparatus comprising a precipitation tank, an inlet therefor comprising pipes extending through the walls of the tank and spaced apart adjacent the bottom thereof, the inner ends being disposed adjacent the walls through which the several pipes extend, a deflector connected to the inner end of each pipe adapted to check the incoming liquid and to return it backwardly and upwardly against the walls in which the liquid enters, means for heating the walls, an adjustable level top outlet device for discharging liquid from the surface of the liquid within the tank, and a heating coil in the tank above the upper surface of the liquid to assist the flow of liquid to the outlet.

6. Oil precipitation apparatus comprising a precipitation tank, an inlet therefor comprising pipes extending through the walls of the tank and spaced apart adjacent the bottom thereof, the outer ends of the pipes being connected together, a supply tank connected to the pipes, a batch tank and a device for connecting the batch tank and the supply tank for maintaining a constant fluid level in the supply tank, the inner ends of the pipes being disposed adjacent the walls through which the several pipes extend, a deflector connected to the inner end of each pipe adapted to check the incoming liquid and to return it backwardly and upwardly against the walls in which the liquid enters, means for heating the walls, an adjustable level top outlet device for discharging liquid from the surface of the liquid within the tank, and a heating coil in the tank above the upper surface of the liquid to assist the flow of liquid to the outlet.

7. Oil precipitation apparatus comprising a precipitation tank, an outlet therefor, an inlet comprising a tube extending through the wall of the tank, and a deflector at the end of the tube within the tank shaped to check the incoming liquid and to direct it backwardly and upwardly from the end of the tube.

In testimony whereof I have signed my name to this specification, in the presence of two subscribing witnesses, on this 26th day of December, A. D. 1911.

WILLIAM L. MORRIS.

Witnesses:
J. W. BURROWS,
C. M. SMITH.